(12) United States Patent
Wang et al.

(10) Patent No.: US 12,430,544 B2
(45) Date of Patent: Sep. 30, 2025

(54) HETEROGENEOUS ARCHITECTURE FOR DEPTHWISE-SEPERABLE CONVOLUTION BASED NEURAL NETWORK COMPUTATION ACCELERATION

(71) Applicant: Black Sesame International Holding Limited, San Jose, CA (US)

(72) Inventors: Yi Wang, San Jose, CA (US); Zheng Qi, Cupertino, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 1067 days.

(21) Appl. No.: 17/460,584

(22) Filed: Aug. 30, 2021

(65) Prior Publication Data

US 2023/0066518 A1    Mar. 2, 2023

(51) Int. Cl.
*G06N 20/00* (2019.01)
*G06N 3/063* (2023.01)

(52) U.S. Cl.
CPC .................................. *G06N 3/063* (2013.01)

(58) Field of Classification Search
CPC ........ G06N 3/063; G06N 3/048; G06N 3/082; G06N 3/0464; G06N 3/0495; G06N 3/08; Y02D 10/00
See application file for complete search history.

(56) References Cited

U.S. PATENT DOCUMENTS

| | | | | |
|---|---|---|---|---|
| 11,462,003 | B2* | 10/2022 | Gunnam | G06F 17/153 |
| 11,797,830 | B2* | 10/2023 | Gunnam | G06N 3/08 |
| 2008/0319933 | A1* | 12/2008 | Moussa | G06N 3/084 |
| | | | | 706/31 |
| 2020/0082242 | A1 | 3/2020 | Jin et al. | |
| 2020/0082243 | A1 | 3/2020 | Jin et al. | |
| 2020/0082898 | A1 | 3/2020 | Jin et al. | |
| 2020/0184319 | A1* | 6/2020 | Croxford | G06N 3/045 |
| 2020/0234112 | A1 | 7/2020 | Wang et al. | |
| 2020/0349420 | A1* | 11/2020 | Ovsiannikov | G06N 3/045 |
| 2020/0402263 | A1* | 12/2020 | Larson | G06T 1/20 |
| 2021/0279568 | A1* | 9/2021 | Yoo | G06F 9/3887 |
| 2021/0319317 | A1* | 10/2021 | Power | G06F 17/15 |
| 2021/0357734 | A1* | 11/2021 | Mahale | G06N 3/045 |
| 2022/0156554 | A1* | 5/2022 | Fu | G06N 3/04 |

OTHER PUBLICATIONS

Chen, Weiguang, et al. "Accelerating compact convolutional neural networks with multi-threaded data streaming." 2019 IEEE Computer Society Annual Symposium on VLSI (ISVLSI). IEEE, 2019 (Year: 2019).*

(Continued)

*Primary Examiner* — Andrew T McIntosh
(74) *Attorney, Agent, or Firm* — Timothy T. Wang; Ni, Wang & Massand, PLLC (57) ABSTRACT

The present invention relates to a method and a system for performing depthwise separable convolution on an input data in a convolutional neural network. The invention utilizes a heterogeneous architecture with a number of MAC arrays including 1D MAC arrays and 2D MAC arrays with a Winograd conversion logic to perform depthwise separable convolution. The depthwise separable convolution uses less weight parameters and thus less multiplications while it obtains the same computation results as the traditional convolution.

10 Claims, 4 Drawing Sheets

(56) References Cited

OTHER PUBLICATIONS

Cheng, Chao, and Keshab K. Parhi. "Fast 2D convolution algorithms for convolutional neural networks." IEEE Transactions on Circuits and Systems I: Regular Papers 67.5 (2020): 1678-1691 (Year: 2020).*

Bytyn, Andreas, Rainer Leupers, and Gerd Ascheid. "Convaix: An application-specific instruction-set processor for the efficient acceleration of cnns." IEEE Open Journal of Circuits and Systems 2 (2020): 3-15 (Year: 2020).*

* cited by examiner

HETEROGENEOUS ARCHITECTURE FOR DEPTHWISE-SEPERABLE CONVOLUTION BASED NEURAL NETWORK COMPUTATION ACCELERATION

FIELD OF INVENTION

The present invention relates generally to artificial neural networks. More particularly, the present invention relates to efficient convolutional neural network structures to reduce computational costs and memory requirements associated with convolutional neural networks.

BACKGROUND OF THE INVENTION

A convolution is a linear operation that involves the multiplication of a set of weights with the input, much like a traditional neural network. The convolutional neural network, or CNN for short, is a specialized type of neural network model designed for working with two-dimensional image data, although they can be used with one-dimensional and three-dimensional data.

A convolution is the simple application of a filter to an input that results in an activation. Repeated application of the same filter to input results in a map of activations is called a feature map, indicating the locations and strength of a detected feature in an input, such as an image.

In a convolution operation, the multiplication is performed between an array of input data and a two-dimensional array of weights, called a filter or a kernel. The filter is smaller than the input data and the type of multiplication applied between a filter-sized patch of the input and the filter is a dot product. A dot product is the element-wise multiplication between the filter-sized patch of the input and filter, which is then summed, always resulting in a single value.

Neural network-based perception requires significant amount of computation. In real-time perception applications such as autonomous driving, several tens or hundreds of tera-ops are required. To satisfy the computation demand, traditional approaches for neural network acceleration tend to increase the computation power by adding more hardware resource to the accelerator, be it GPU, TPU/NPU, DSP, FPGA.

The other trend is to reduce the computation complexity from the Neural Network architecture side, i.e, using depthwise separable convolutions to replace the traditional convolution. Unlike typical convolution Neural Network, the major computation units of a depthwise-seperable based Neural Network consist of one depthwise convolution and one or more pointwise convolution.

The depthwise separable convolution uses less weight parameters and thus less multiplications while it obtains the same computation results as the traditional convolution. However, using the traditional accelerator hardware is facing the new challenge to take advantage of the depthwise separable convolutions.

A single uniform design, for example, 2D/3D systolic array can't map the heterogeneous computation of the depthwise separable convolution efficiently. The depthwise separable convolution are mostly I/O bounded, i.e. DDR bandwidth, so that the costly hardware computation resource may not even be able to improve the performance, i.e the computation throughput. By analyzing the arithmetic properties of the depthwise separable convolution, the typical Neural Network architectures use depthwise separable convolutions as the computation backbones.

A high utilization, power efficient, heterogeneous architecture for Depthwise-seperable convolutions based Neural Network Computation Acceleration is proposed, with the architecture consisting of one/more2-dimensional MAC-array (Multiplier and Accumulator array) and one (or more) 1-dimensional MAC-array, tilting logic to map computation, shared/dedicated memory for both arrays, Winograd conversion logic.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced texture replacement system that recognizes textures in the background of the multimedia in real-time using a deep neural network for recognising.

SUMMARY OF THE INVENTION

Convolution is a very important mathematical operation in artificial neural networks (ANNs). Convolutional neural networks (CNNs) can be used to learn features as well as classify data with the help of image frames. There are many types of CNN's. One class of CNN's are depth wise separable convolutional neural networks. These type of CNNs are widely used because of the following two reasons—a) They have lesser number of parameters to adjust as compared to the standard CNNs, which reduces over-fitting and b) they are computationally cheaper because of fewer computations which makes them suitable for mobile vision applications The depthwise separable convolution is so named because it deals not just with the spatial dimensions, but with the depth dimension and the number of channels as well. Suppose there is an input data of size $Df \times Df \times M$, where $Df \times Df$ can be the image size and M is the number of channels (3 for an RGB image). Suppose there are N filters/kernels of size $Dk \times Dk \times M$. If a normal convolution operation is done, then, the output size will be $Dp \times Dp \times N$.

In depth-wise operation, convolution is applied to a single channel at a time unlike standard CNNs in which it is done for all the M channels. So here the filters/kernels will be of size $Dk \times Dk \times 1$. Given there are M channels in the input data, then M such filters are required. Output will be of size $Dp \times Dp \times M$. In point-wise operation, a $1 \times 1$ convolution operation is applied on the M channels. So the filter size for this operation will be $1 \times 1 \times M$. If N such filters are used, the output size becomes $Dp \times Dp \times N$.

By analyzing the arithmetic properties of the depthwise separable convolution, and the typical Neural Network architectures, which are using depthwise separable convolutions as the computation backbones, a high utilization, power efficient, heterogeneous architecture for Depthwise-seperable convolutions based Neural Network Computation Acceleration is disclosed in the present invention.

The architecture consists of one/more2-dimensional MAC-array (Multiplier and Accumulator array) and one (or more) 1-dimensional MAC-array, tilting logic to map computation, shared/dedicated memory for both arrays. Winograd conversion logic.

Pointwise convolution is a special convolution in that the kernel of one output channel is a scale value. So, the convolution can be directly mapped into a Matrix-to-Matrix multiplication without the overhead to duplication weight or activation, i.e. as convert normal convolution using im2col algorithm. Any typical 2-dimensional MAC array structure, e.g. 2-dimensional systolic array for matrix-matrix multiplication or in more general case, a GEMM (General matrix multiply) module is able to conduct the computation with close to 100% hardware utilization.

A 1-dimensional MAC array is used to compute Winograd convolution to conduct the equivalent computation with the depthwise convolution. A depthwise convolution is different from the typical convolution in that each input channel uses one kernel to compute the corresponding output channel. The depthwise convolution will not change the number of the channel. Moreover, there is no cross-channel accumulation. In other words, the kernel reuse level for a depthwise convolution is very low.

Therefore, traditional hardware acceleration using the systolic array with higher dimension (>2) can't be used to improve the convolutional performance. Using 2-dimensional systolic array to compute the depthwise convolution is either lack of scalability or has low hardware utilization. The Winograd algorithm converts the convolution in the spatial domain to the dot product in the Winograd domain, which makes using of 1-D MAC array to implement the computation feasible.

The most efficient computation order of the pointwise convolution is processing the data along the channel direction while the most efficient computation order of the depthwise computation is to process one channel at a time.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE FIGURES

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE FIGURES

Convolution is a very important mathematical operation in artificial neural networks (ANNs). Convolutional neural networks (CNNs) can be used to learn features as well as classify data with the help of image frames. There are many types of CNN's. One class of CNN's are depth wise separable convolutional neural networks. These type of CNNs are widely used because of the following two reasons—a) They have lesser number of parameters to adjust as compared to the standard CNNs, which reduces overfitting and b) they are computationally cheaper because of fewer computations which makes them suitable for mobile vision applications The depthwise separable convolution is so named because it deals not just with the spatial dimensions, but with the depth dimension and the number of channels as well. Suppose there is an input data of size Df×Df×M, where Df×Df can be the image size and M is the number of channels (3 for an RGB image). Suppose there are N filters/kernels of size Dk×Dk×M. If a normal convolution operation is done, then, the output size will be Dp×Dp×N.

In depth-wise operation, convolution is applied to a single channel at a time unlike standard CNNs in which it is done for all the M channels. So here the filters/kernels will be of size Dk×Dk×1. Given there are M channels in the input data, then M such filters are required. Output will be of size Dp×Dp×M. In point-wise operation, a 1×1 convolution operation is applied on the M channels. So the filter size for this operation will be 1×1×M. If N such filters are used, the output size becomes Dp×Dp×N.

Figure 1:
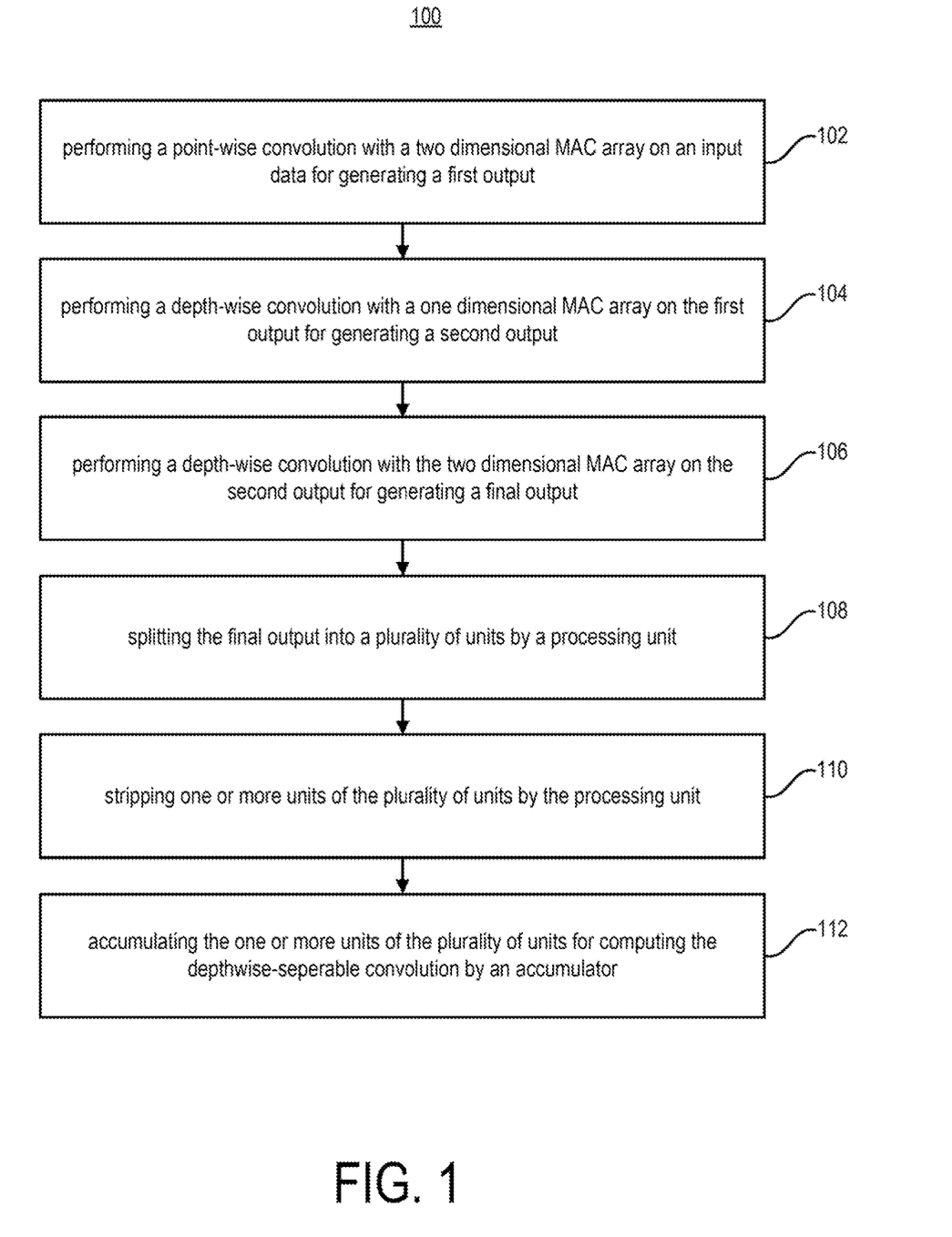
FIG. 1 illustrates a method for achieving high utilization of a neural network based computation using depthwise-seperable convolution.

FIG. 1 illustrates a method for achieving high utilization of a neural network based computation using depthwise-seperable convolution as depicted by the flowchart 100. The method includes step of performing a point-wise convolution with a two dimensional MAC array on an input data for generating a first output within a spatial domain 102. The next step includes performing a depth-wise convolution with a one dimensional MAC array on the first output for generating a second output within a Winograd domain 104.

The Winograd algorithm converts the depthwise convolution in the spatial domain to the dot product in the Winograd domain, which makes using 1-D MAC array to implement the computation feasible. The method further includes performing a depth-wise convolution with the two dimensional MAC array on the second output for generating a final output within the spatial domain from the Winograd domain 106. A configurable adder tree structure to implement the Winograd to/from spatial domain conversion is introduced to support multiple kernel size.

The next step involves splitting the final output into a plurality of units by a processing unit 108. This is done by a dedicated tile processing unit which can spilt a spatial activation into tiles so that a larger kernel size or convolution. The kernel size with stride >1 can be decomposed into multiple depthwise convolutions with smaller kernel size (less than 3×3). The next step includes stripping one or more units of the plurality of units by the processing unit 110 followed by accumulating the one or more units of the plurality of units for computing the depthwise-seperable convolution by an accumulator in the processing unit 112.

Figure 2:
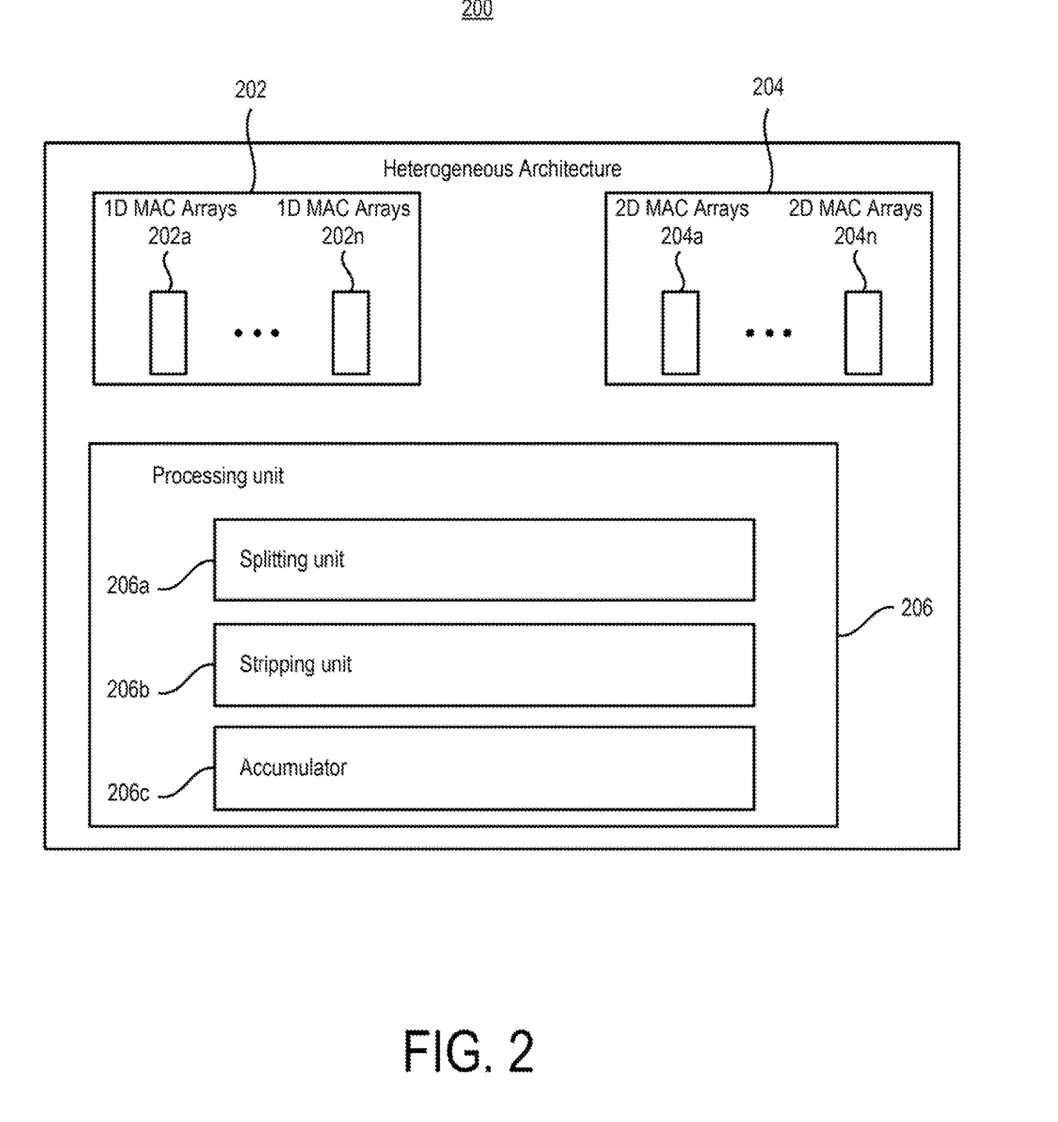
FIG. 2 illustrates a heterogeneous architecture for depthwise-seperable convolution based neural network computation.

FIG. 2 illustrates a heterogeneous architecture 200 for depthwise-seperable convolution based neural network computation acceleration. The heterogeneous architecture includes multiple MAC arrays to perform depthwise-separable convolution. The MAC arrays include one or more 1D MAC arrays 202 and 2D MAC arrays 204). The depthwise separable convolution includes a depthwise convolution and a pointwise convolution. The MAC arrays include one or more 2-dimensional MAC-arrays 204 for performing pointwise convolution in a spatial domain. The one or more 2-dimensional MAC-arrays 204 perform pointwise convolution on an input data to generate a first output.

The MAC arrays further include one or more 1-dimensional MAC-arrays 202 for performing depthwise convolution on the first output, wherein the one or more 1-dimensional MAC-arrays perform the depthwise convolution on the first output obtained. The one or more 1-dimensional MAC arrays 202 compute the depthwise convolution of the first output in the Winograd domain by converting the domain from spatial domain to Winograd domain with the help of an adder tree structure. The one or more 1-dimensional MAC-arrays 202 perform depthwise convolution on the first output and generate a second output. The Winograd algorithm converts the convolution in the spatial domain to the dot product in the Winograd domain, which makes using 1-D MAC arrays 202 to implement the computation feasible.

The one or more 2D MAC arrays 204 further perform the point-wise convolution on the second output to generate a final output. The final output is obtained in the spatial domain and the conversion of domain is done by the Winograd adder structure tree.

The heterogeneous architecture further includes a processing unit 206 that includes multiple functional elements. The processing unit 206 includes a splitting unit 206*a* which is a dedicated tile processing unit that can spilt the final output obtained into tiles (with overlapping) so that a larger kernel size or convolution with stride >1 can be decomposed into multiple depthwise convolutions with smaller kernel size (less than 3×3).

The system includes a stripping mechanism configured within a stripping unit 206*b* (which is deployed in the BST chips) which processes the entire activation at a smaller unit (stripping). Therefore, multiple depthwise-separable convolutions can be processed by a single DDR load and a single DDR store, which further reduce the DDR access.

Further, an add accumulator 206*c* in Winograd to spatial domain conversion unit to support tile-based accumulation is introduced. The 1D depthwise convolution unit and the conversion adder tree can be absorbed into the more generic element-wise processing unit to implement the 1-dimensional array so that the same hardware resource can serve different computational demands for a convolutional Neural Network.

When comparing to the 3-D MAC array architectures which take advantage of the data reuse crossing the channel direction, the disclosed architecture uses much less area to accomplish the same computation requirement since it can achieve the highest possible hardware utilization. To compute the same inference of a depthwise separable convolution based neural network, it consumes much less power. When comparing the unified MAC array architecture, which uses only 2D accelerators architecture. i.e, a CPU with hardware GEMM, the disclosed architecture uses slightly more area. I.e. I-D array 202 for the depthwise convolution. For example, a system with a N-by-N 2D array and a N-by-1 1-array, can achieve more than 2 times throughput than a system with only a N-by-N 2D array.

When comparing the typical architecture with I-D array. i.e. a vector machine like a DSP, the disclosed architecture uses more area, i.e, 2-D array 204 for the point-wise convolution. The hybrid architecture reduces the DDR access because the data can be now shared locally between/among the MAC arrays, which reduce the power computation. Also, it allows a design to adjust the shape of the 2D arrays 204 and 1D arrays 202 to best suit the system DDR bandwidth according to the distribution of the different computation demand, i.e. depthwise convolutions and point-convolutions, which further enhances the hardware utilization for the system.

Figure 3:
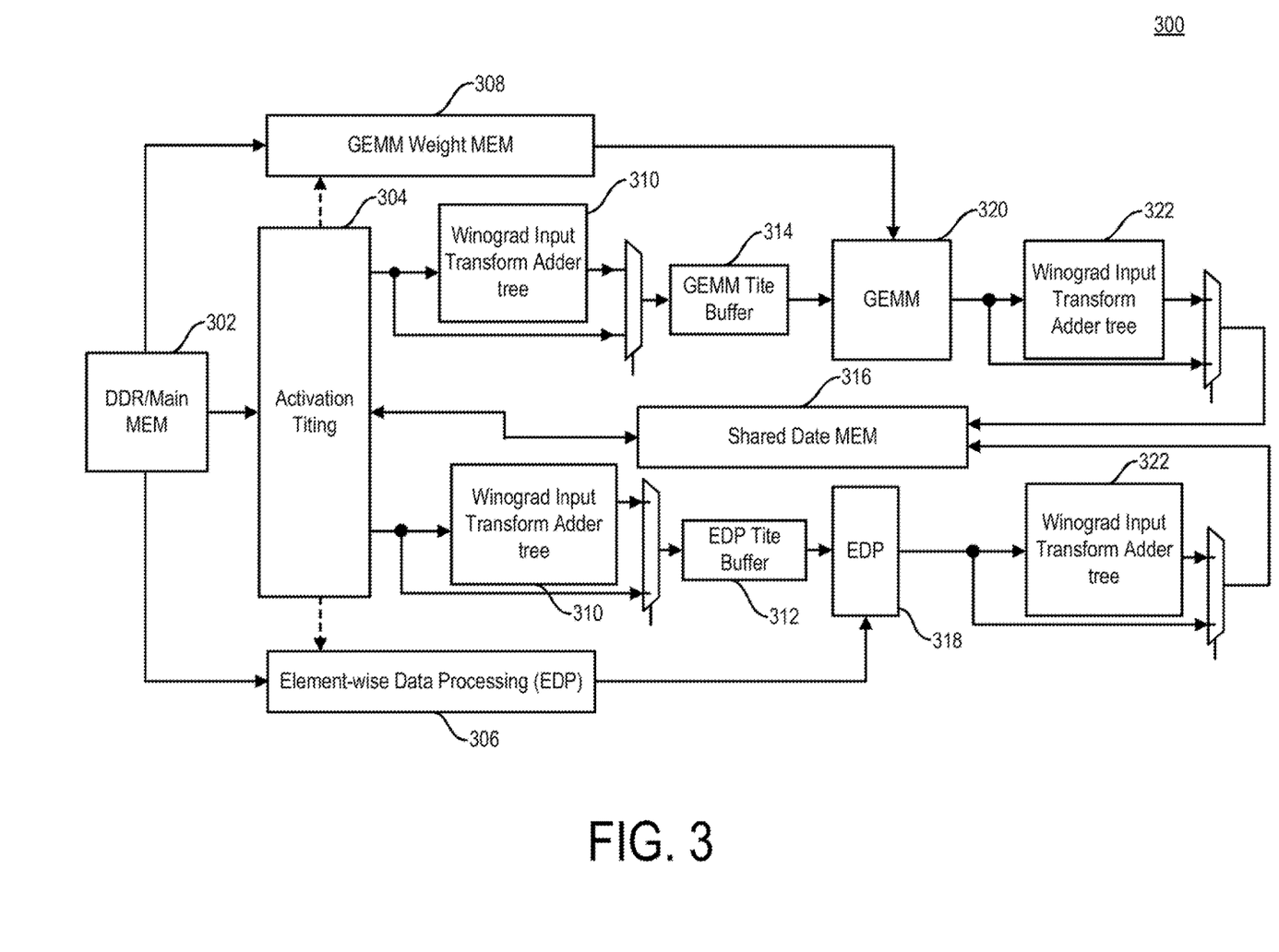
FIG. 3 illustrates the heterogeneous architecture of the neural network based computation using depthwise-seperable convolution in accordance with the present invention.

FIG. 3 illustrates architecture of a neural network based computation using depthwise-seperable convolution in accordance with the present invention. An add accumulator inside the processing unit in Winograd to spatial domain conversion unit to support tile-based accumulation is introduced. The 1D depthwise convolution unit and the conversion adder tree can be absorbed into the more generic element-wise processing unit to implement the 1-dimensional array so that the same hardware resource can serve different computational demands for a convolutional Neural Network.

The example model structure 30) puts nearly all of the computation into dense 1×1 convolutions. The DDR 302 is distributed via two branches employing Element-wise Data Processing (EDP) weight MEM 306 (Electronic data processing technique) and GEMM weight MEM 308 which is a highly optimized general matrix multiply. Tiled convolutional network of the invention uses a novel weight-tying scheme ("tiling") i.e. Activation Tiling unit 304 that simultaneously enjoys the benefit of significantly reducing the number of learnable parameters. A configurable adder tree structure 310 to implement the Winograd to or from spatial domain conversion is introduced to support multiple kernel size right after the activation tiling block 304 in both branches as shown in the figure. In both branches, after the conversion from the spatial domain to Winograd domain, a partial output in form of Element-wise Data Processing (EDP) tile buffer 312 and GEMM tile buffer 314 is obtained which is fed to an Element-wise Data Processing (EDP) unit 318 and GEMM unit 320 respectively.

The output of Element-wise Data Processing (EDP) unit 318 and GEMM unit 320 is provided to a Winograd input transform adder tree 322 which receives the output of the two units and performs spatial to Winograd domain conversion of the received output. From the Winograd input transform adder tree 322 the final output is taken to the activation tiling unit 304 which breaks the output into multiple tiles.

Three depth wise Winograd convolution data scheduling schemes that are proposed in the present invention are 'Weight broadcast and activation unicast', 'Weight unicast and activation unicast' and 'Mixed data scheduling'. Weight broadcast and activation unicast data scheduling scheme has a simple design and requires one data cycle for weight loading. However, one of the disadvantages of this scheme is that it produces output channels one by one. Thus, the output can't be consumed by the hardware that uses 2-dimensional MAC array to compute the pointwise convolution.

The second scheduling scheme which is 'Weight unicast and activation unicast' produces output tiles of multiple channels at the same time. The output can be fed to the pointwise convolution unit directly, which simplifies storage control. However, this requires D data/cycle memory bandwidth for weight loading, where D is the number MAC unit in the array.

The third data scheduling scheme which is the Mixed data scheduling organizes 1D array as groups. Within one group, it uses weight broadcast and activation unicast scheme and produces one output channel at a time. Each group computes using different kernels. Therefore, weights are unicasted to each group. The weight loading bandwidth is D/G, where G is number of groups.

For integer-based inference, the direct Winograd implementation requires wider data precision to maintain the exactly same result. Three quantization mechanisms to the meet different precision requirements have been proposed in the invention.

1. Direct Winograd implementation: The advantage of such an implementation is that it exactly matches results. However, there is no power saving in this implementation.
2. Quantize the activation in Winograd domain: The advantage of such an implementation is that it requires small hardware area and less power consumption. However, there is no guarantee for the exact matching results with corresponding depthwise convolution, thereby reducing the accuracy of the Neural Network.
3. Mixed precision Winograd implementation: The advantage of such an implementation is that it uses the optimal precision to balance the power and area (which is essentially supported by the element wise processing unit).

Figure 4:
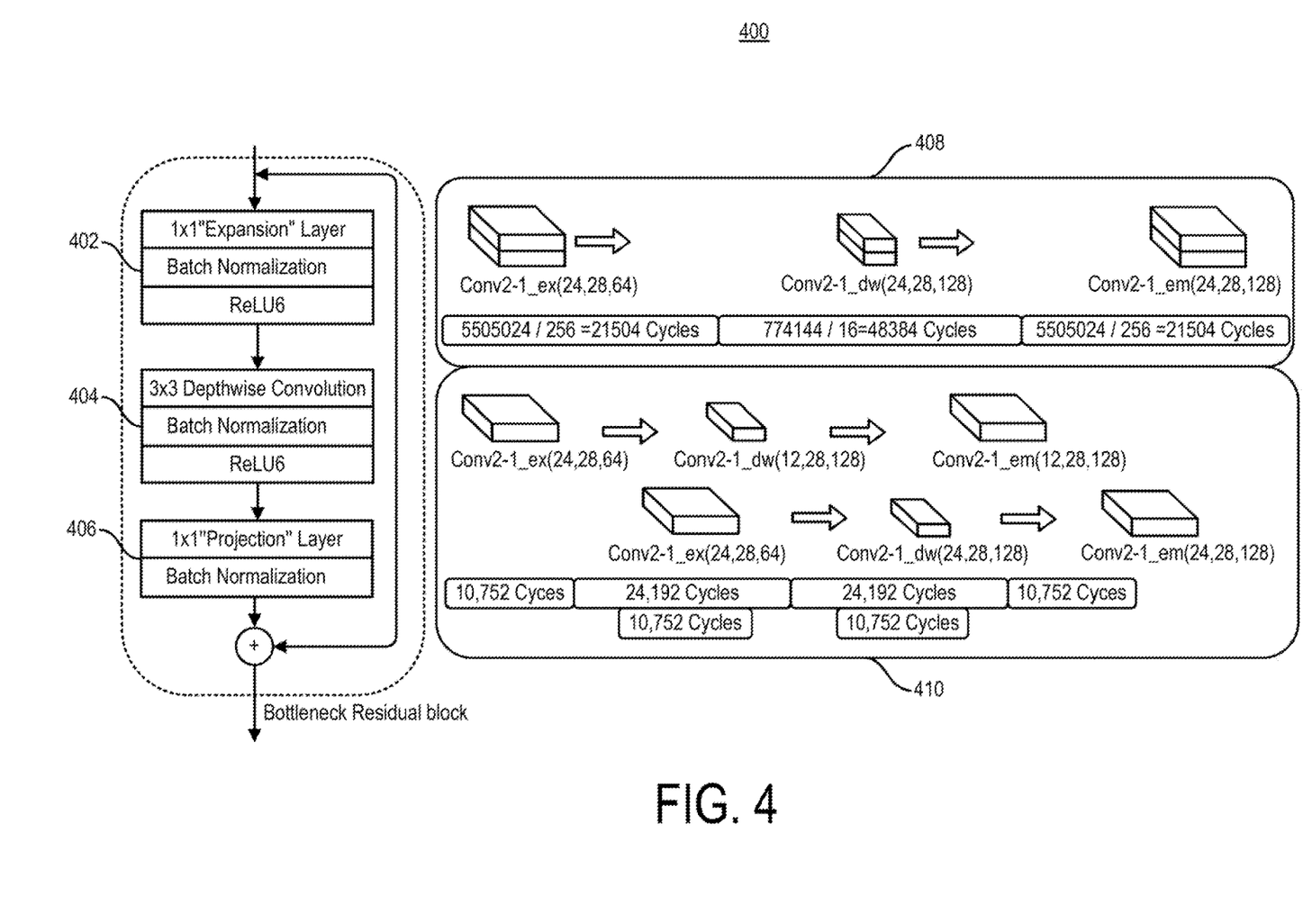
FIG. 4 illustrates pseudo pipelined processing in accordance with the present invention.

FIG. 4 illustrates pseudo pipelined processing. The most efficient computation order of the pointwise convolution is processing the data along the channel direction while the most efficient computation order of the depthwise computation is to process one channel at a time. The activation of the pointwise convolution is partitioned within the spatial domain, so that the 2-dimensional MAC array can produce partial outputs to feed the 1-D depthwise convolution unit. The activation of the depthwise convolution is partitioned within the spatial domain. The outputs are then ready to be processed by the pointwise convolution.

Relu6 can be used as the source of non-linearity, because of its robustness properties when used with low-precision computation. Kernel size 3×3 can be used, as is standard for modern network. During training, dropout and batch normalization can be utilized as illustrated by blocks 402 and 404. Batch normalization is a layer that allows every layer of the network to do learning more independently. It is used to normalize the output of the previous layers. In block 402 technique of batch normalization is utilized on a 1×1 Expansion layer while in block 404 batch normalization is utilized on 3×3 depthwise convolution. Further in block 406, the technique of batch normalization is applied to 1×1 projection layer. The three blocks 402, 404 and 406 are added to an input received by block 402 to give a bottleneck residual block.

Small buffers are deployed between the pointwise convolution unit and the depthwise convolution unit, so that the data are processed in a pseudo pipeline manner as shown by 408 and 410 in FIG. 4. Given N is the number of the pointwise convolution units and depthwise convolution units, the pseudo pipelined processing boosts the throughout up to N times.

The intermediate results are distributed stored in the pipeline buffer, which reduce the number of DDR access and reduces the data loading cycles, and speeds up the processing. Processing in a pseudo pipelined manner reduces DDR bandwidth demand for the system and lowers the power consumption for DDR access.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:
1. A method for achieving high utilization of a neural network based computation using depthwise-separable convolution, wherein the method comprising:
    performing a point-wise convolution with a two dimensional MAC array on an input data for generating a first output within a spatial domain, wherein the first output is distributed and stored in a pipeline buffer;
    performing a depth-wise convolution with a one dimensional MAC array on the first output for generating a second output within a Winograd domain;
    performing a point-wise convolution with the two dimensional MAC array on the second output for generating a final output within the spatial domain from the Winograd domain;
    splitting the final output into a plurality of units by a processing unit;
    stripping one or more units of the plurality of units by the processing unit, wherein stripping the one or more units allow processing depthwise-separable convolution by a single DDR load and a single DDR store limits access to the DDR; and
    accumulating the one or more units of the plurality of units for computing the depthwise-separable convolution.
2. The method in accordance with claim 1, wherein processing of the first output to the second output from the point-wise convolution to the depth-wise convolution is performed by using a number of buffers.

3. The method in accordance with claim 2, wherein the number of buffers form a pseudo pipeline.

4. The method in accordance with claim 1, wherein the conversion from the spatial domain to the Winograd domain is performed by an adder tree structure.

5. The method in accordance with claim 4, wherein the conversion from the Winograd domain to the spatial domain is performed by an adder tree structure.

6. The method in accordance to claim 4, wherein the adder tree structure supports different kernel sizes.

7. The method in accordance with claim 1, wherein the neural network architecture is a heterogeneous architecture.

8. The method in accordance with claim 1, wherein the depthwise-separable convolution reduces computation complexity and power demand.

9. A heterogeneous architecture for depthwise-separable convolution based neural network computation acceleration, wherein the heterogeneous architecture comprising:
   a plurality of MAC arrays to perform depthwise-separable convolution, wherein the depthwise-separable convolution, further wherein the plurality of MAC arrays comprising:
      one or more two-dimensional MAC-arrays for performing a point-wise convolution in a spatial domain, wherein the one or more two-dimensional MAC-arrays performs the point-wise convolution on an input data to generates a first output, wherein the first output is distributed and stored in a pipeline buffer; and
      one or more one-dimensional MAC-arrays for performing a depthwise convolution in a Winograd domain, wherein the one or more one-dimensional MAC-arrays performs the Winograd convolution on the first output to generate a second output, further wherein the one or more two-dimensional MAC-arrays performs the point-wise convolution on the second output with an adder tree structure to generate a final output;
   a processing unit, wherein the processing unit comprising:
      a splitting unit, wherein the splitting unit splits the final output into a plurality of tiles;
      a stripping unit, wherein the stripping unit strips one or more units of the plurality of tiles, wherein stripping the one or more units allow processing depthwise-separable convolution by a single DDR load and a single DDR store limits access to the DDR; and
      an accumulator, wherein the accumulator accumulates the one or more units of the plurality of tiles for computing the depthwise-separable convolution.

10. A computer program product comprising a non-transitory computer useable medium having computer program logic for enabling at least one processor in a computer system for performing a high utilization of a neural network based computation using depthwise-separable convolution, said computer program logic comprising:
   performing a point-wise convolution with a two dimensional MAC array on an input data for generating a first output within a spatial domain, wherein the first output is distributed and stored in a pipeline buffer;
   performing a depth-wise convolution with a one dimensional MAC array on the first output for generating a second output within a Winograd domain;
   performing a point-wise convolution with the two dimensional MAC array on the second output for generating a final output within the spatial domain from the Winograd domain;
   splitting the final output into a plurality of units by a processing unit;
   stripping one or more units of the plurality of units by the processing unit, wherein stripping the one or more units allow processing depthwise-separable convolution by a single DDR load and a single DDR store limits access to the DDR; and
   accumulating the one or more units of the plurality of units for computing the depthwise-separable convolution.

* * * * *